March 11, 1947.　　　R. A. GOEPFRICH　　　2,417,192
BRAKE
Filed June 18, 1945　　　4 Sheets-Sheet 1

INVENTOR.
RUDOLPH A. GOEPFRICH
BY
T. J. Plante
ATTORNEY

INVENTOR.
RUDOLPH A. GOEPFRICH
BY
T. J. Plante
ATTORNEY

Patented Mar. 11, 1947

2,417,192

UNITED STATES PATENT OFFICE 2,417,192

BRAKE

Rudolph A. Goepfrich, South Bend, Ind., ass'gnor to Bendix Aviation Corporation, South Bend, Ind., a corporation of Delaware Application June 18, 1945, Serial No. 600,048

7 Claims. (Cl. 188—152)

This invention relates to brakes, and particularly to brakes in which a plurality of shoes are moved outwardly into contact with a brake drum.

The primary object of the present invention is to provide improved brake actuating means, both from the standpoint of simplicity, and from the standpoint of adaptability to the space limitations of the vehicle on which the brakes are to be used.

A more specific object of the present invention is to provide improved actuating means for brakes of the type having two shoes which are "leading" shoes in both directions of vehicle movement, or, in other words, two shoes which are individually shiftable to anchor at either end depending upon the direction of drum rotation.

Other objects and advantages of the invention will become apparent during the following description. In the drawings:

Figure 5 is a front elevation showing a brake actuating arrangement similar to that shown in Figure 1 but applied to the front steering knuckle of a vehicle rather than the rear axle housing as is the case in Figure 1.

Referring to the structure shown in Figures 1 to 4, the brake may comprise the usual drum 12, two shoes 14 and 16 provided with suitable lining, and non-rotatable supporting means for said shoes. The arrangement of the shoes and the supporting means therefor, also the shoe adjusting mechanism, may be comparable to that disclosed in Goepfrich and House application Serial No. 531,384, filed April 7, 1944. A pair of cylinders or housings 18 and 20, located at opposite sides of the braking assembly, are supported on a spider 22 which is secured to a fixed part of the vehicle, such as the axle housing.

Figure 1:
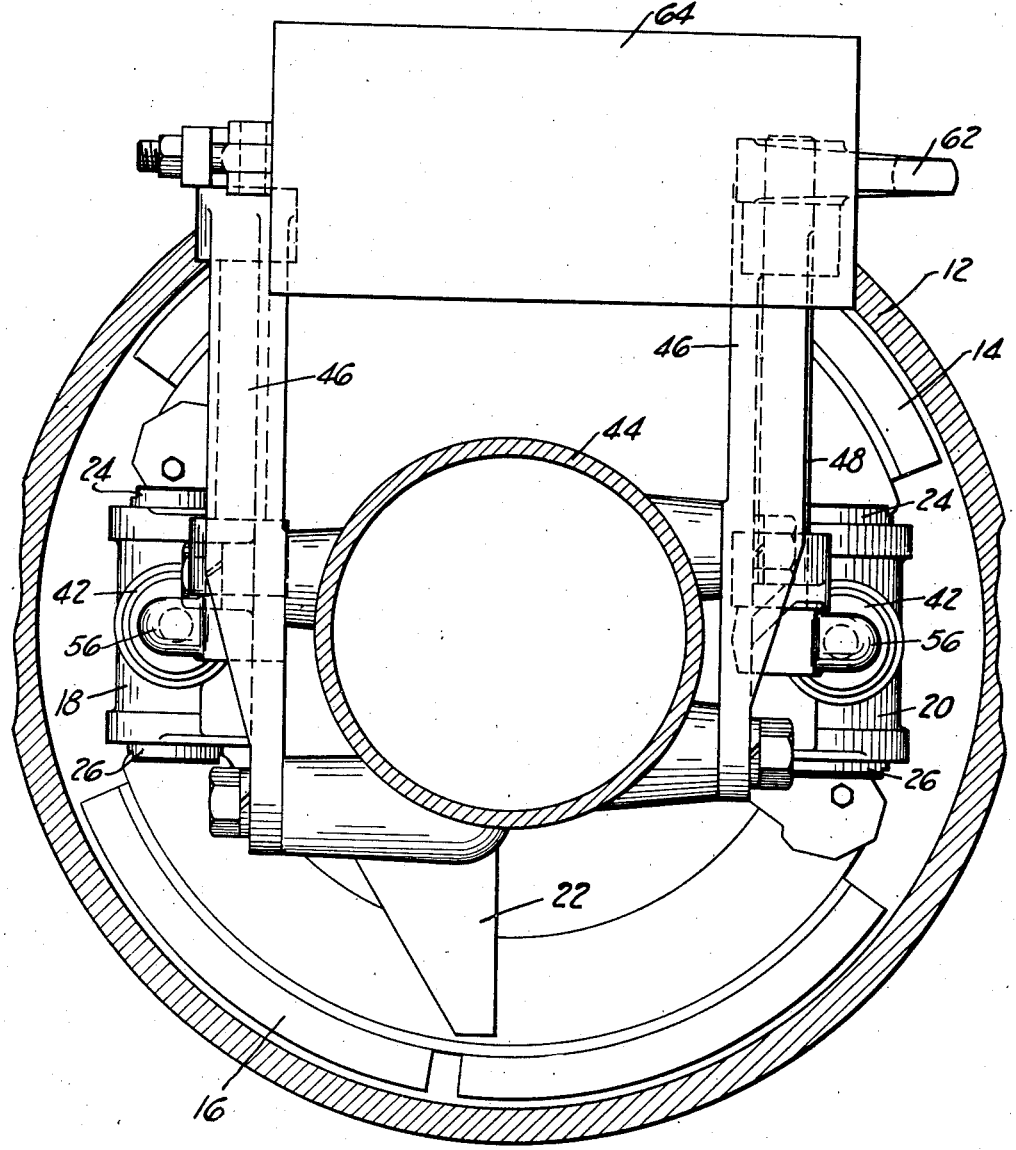
Figure 1 is a side elevation of a brake assembly and the actuating mechanism for the brake.
Figure 2:
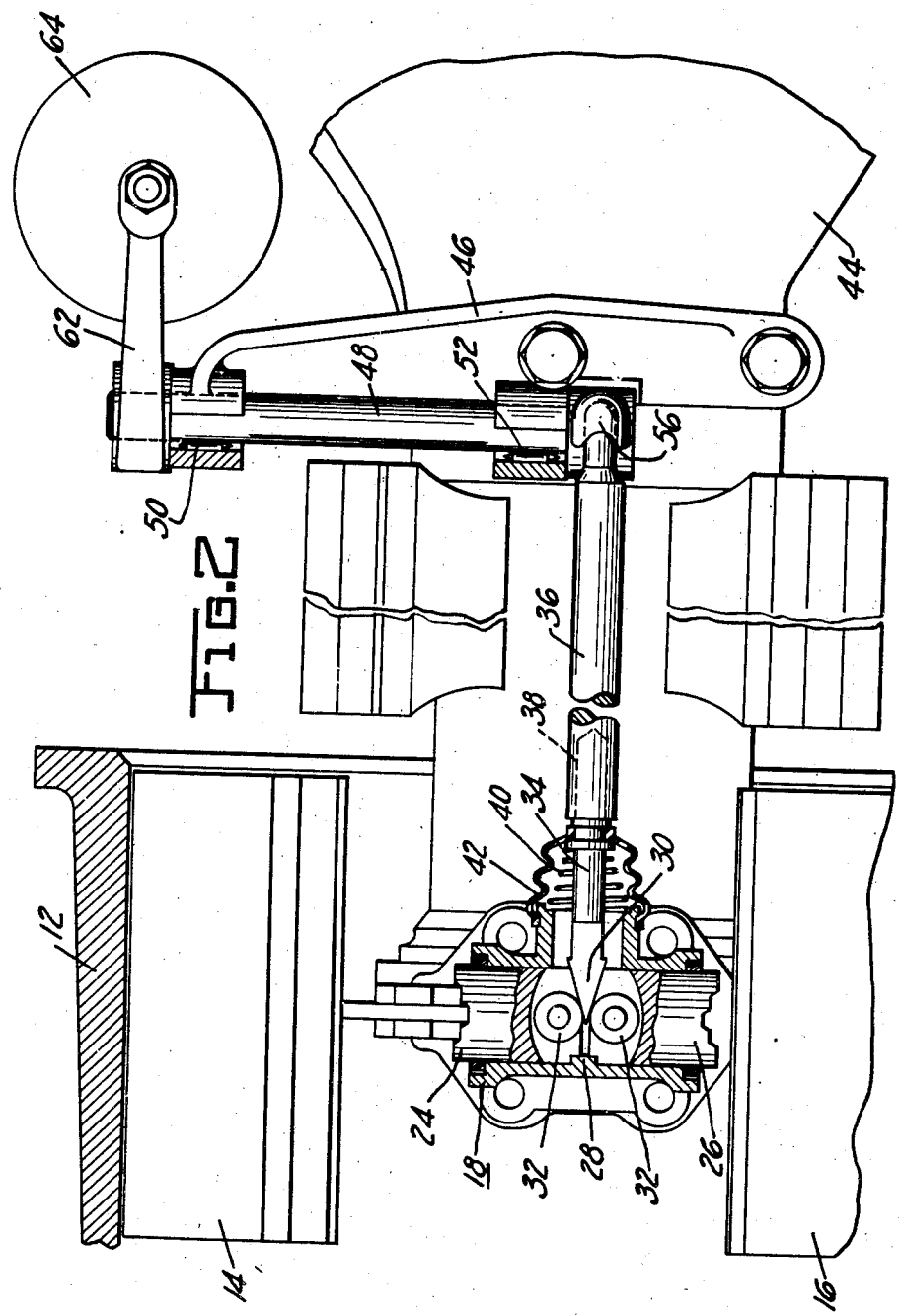
Figure 2 is an end view of the structure shown in Figure 1, with the shoe-spreading device shown in section.
Figure 3:
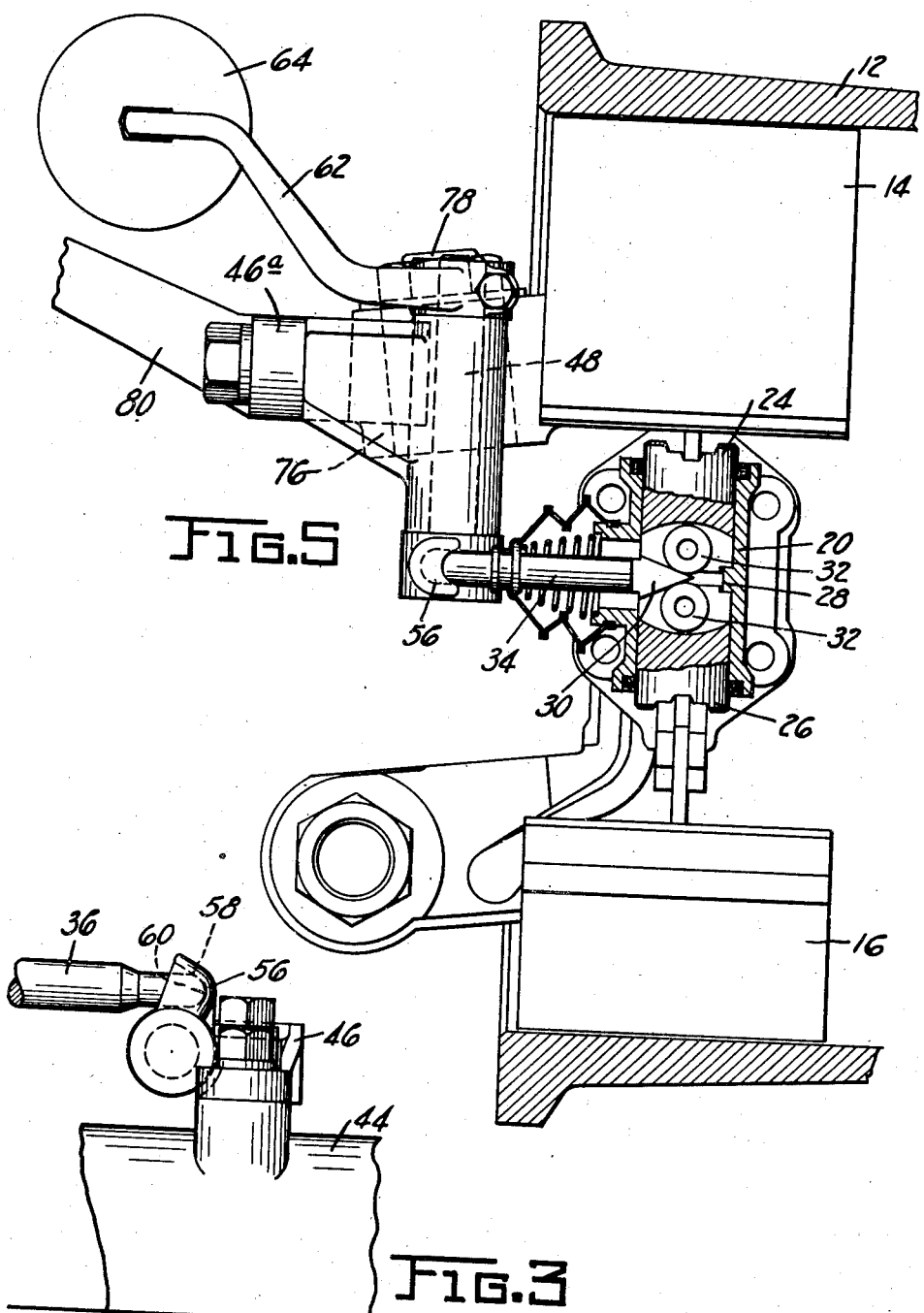
Figure 3 is a partial view looking upwardly at the arrangement shown in Figure 2.

Since the actuating mechanism located in each of the housings 18 and 20 is the same, the description hereinafter applied to one of them is applicable equally well to the other. Referring to Figure 2, within each housing a pair of plungers 24 and 26 are reciprocable. These plungers may be maintained in released position against the opposite sides of a shoulder 28 provided within the housing. This shoulder may also serve to take the anchoring torque of whichever plunger is anchored during a given brake operation. The plungers are urged apart by means of wedge-shaped member 30 which is moved along a line parallel to the axis of the brake assembly. Preferably a roller 32 is supported in each of the plungers to minimize the friction between the wedge-shaped actuating members and said plungers.

The thrust rod which actuates the wedge 30 is preferably formed in two parts, the first portion 34 being integral with the wedge, and the second portion 36 being formed separately and having a socket 38 to receive the end of portion 34.

The advantage of this arrangement is that the member 30—34 may be made the same length for various brake assemblies, and the length of rod 36 may be varied to accommodate the distance between the brake and the mechanism which exerts a thrust on the wedge. A spring 40 urges the wedge member to released position, and a boot 42 protects the interior of the housing from dirt and other extraneous matter.

Mounted on the rear axle housing 44 is a bracket 46, which supports, at spaced points, a pair of substantially vertically extending shafts 48. Each of the shafts may be supported in upper and lower bearings 50 and 52 lodged in the bracket 46. Rotatable with each shaft, at the lower end thereof, is an arm 56 (see particularly Figure 3), which is provided with a socket 58 receiving the spherically shaped end 60 of rod 36.

Figure 4:
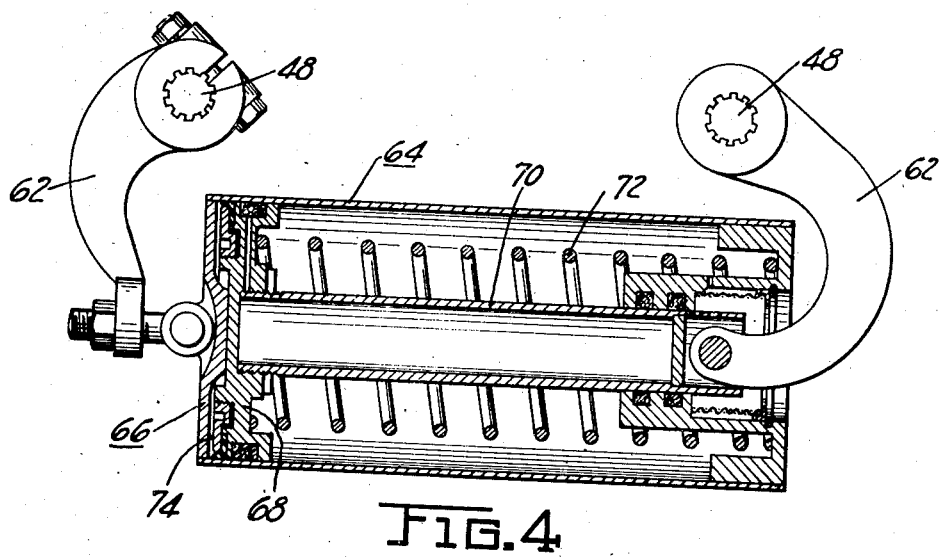
Figure 4 is a horizontal section showing the fluid pressure applying device of the brake.

At the upper end of each shaft, an arm 62 is secured thereto, and, referring to Figure 4, the two arms 62 are connected to a fluid pressure actuating device 64 at opposite ends thereof. This fluid pressure actuating device may comprise a cylinder 66 which is secured to and supported by one of the levers 62, and a piston 68 reciprocable in cylinder 66, having a tubular stem 70 secured to the other lever 62, and also supported by the lever. A spring 72 normally holds cylinder 66 and piston 68 in the relative positions shown.

When the operator wishes to apply the brakes, fluid under pressure is caused to be admitted to chamber 74, thereby exerting a spreading force between piston 68 and cylinder 66. Simultaneous movement of said piston and cylinder swings the two arms 62 to turn the two shafts 48, thereby moving the arms 56 at the lower ends of the shafts to exert a thrust through rods 36 on the wedge-shaped members 30. This results in spreading the shoes until they come in contact with the brake drum. Depending upon the direction of rotation of the drum, each shoe will anchor at one end or the other against the shoulder 28 in the respective housing. The action of each wedge-shaped member will then be concentrated upon applying force to the unanchored end of one of the shoes. During brake application each wedge-shaped member will move slightly away from the center of the respective housing, inclining slightly away from its normal center line. This movement is accommodated by the ball and socket connection between rod 36 and arm 56.

Figure 6:
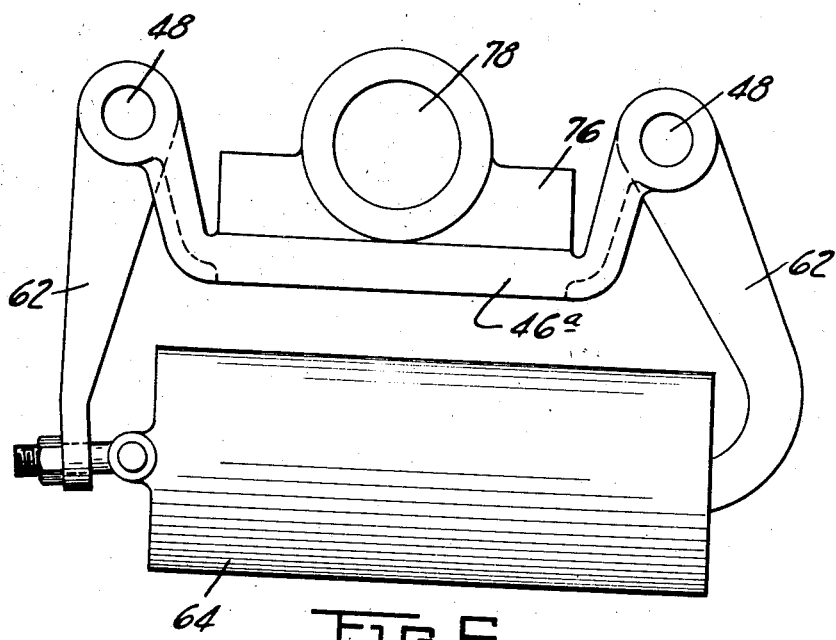
Figure 6 is a plan view of the brake actuating mechanism of Figure 5.

The structure shown in Figures 5 and 6 differs primarily from the structure shown in Figure 4 in mounting the fluid pressure actuator 64 and the levers 62 and shafts 48 in a bracket 46a which is supported upon the steering knuckle 76 of the vehicle, said steering knuckle being pivotally mounted in the conventional manner upon the king pin 78. The king pin is supported in the usual fixed axle 80.

Other than this, the two constructions operate in substantially the same way. The length of the rod 34 which operates the wedge 30 is considerably less than in the other version because the space requirements of the vehicle frame are different. The length of the rod will always depend upon the provision of a suitable location for the actuator 64.

From the foregoing description, it will be apparent that a relatively simple brake actuating mechanism has been provided. Furthermore, it will be obvious that this brake actuating mechanism can be located wherever necessary in order to fit into the structural requirements of the vehicle, and that the arrangement permits of considerable freedom in locating the brake actuating cylinder.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. Applying means, for a brake having a drum and two shoes which are "leading" shoes in both directions of drum rotation, comprising plungers at both ends of both shoes disconnectedly engaging the shoes, rollers mounted on the plungers, two wedges, each acting on the rollers of one pair of plungers, said wedges being movable substantially parallel to the axis of the brake drum to urge the rollers outwardly, and fluid pressure means for actuating said wedges to move the shoes against the drum.

2. Applying means, for a brake having a drum and two shoes which are "leading" shoes in both directions of drum rotation, comprising plungers at both ends of both shoes arranged in pairs for spreading the shoes, rollers mounted on the plungers, two wedges, each acting on the rollers of one pair of plungers, a bracket mounted on a non-rotating supporting member provided on the vehicle, a pair of substantially vertically extending shafts journaled in said bracket, an arm on each of said shafts moved by rotation of the respective shaft to thrust one of the wedges in the roller spreading direction, a second arm on each of the shafts at the opposite end from the aforementioned arm, and a fluid pressure device having two parts which are moved in opposite directions by a change of pressure therein to apply an equalized pressure to said second arms, thereby turning the shafts and actuating the wedges, said fluid pressure device being supported solely by said second arms.

3. Applying means, for a brake having a drum and two shoes which are "leading" shoes in both directions of drum rotation, comprising two wedge-shaped members, each acting to spread the shoes at one end thereof, said wedge-shaped members being movable parallel to the axis of the brake drum, a bracket mounted on a non-rotating supporting member provided on the vehicle, a pair of substantially vertically extending shafts journaled in said bracket, an arm on each of said shafts moved by rotation of the respective shaft to thrust one of the wedges in the roller spreading direction, a second arm on each of the shafts at the opposite end from the aforementioned arm, and a fluid pressure device having two parts which are moved in opposite directions by a change of pressure therein to apply an equalized pressure to said second arms, thereby turning the shafts and actuating the wedges, said fluid pressure device being supported solely by said second arms.

4. Applying means, for a brake having a drum and two shoes which are "leading" shoes in both directions of drum rotation, comprising two wedge-shaped members, each acting to spread the shoes at one end thereof, said wedge-shaped members being movable parallel to the axis of the brake drum, a pair of shafts journaled in a supporting member, an arm on each of said shafts moved by rotation of the respective shaft to thrust one of the wedge-shaped members in the shoe spreading direction, a second arm on each of the shafts, and a fluid pressure device having two parts which are simultaneously moved by a change of pressure to rotate said second arms, thereby turning the shafts and actuating the wedges, said fluid pressure device being supported solely by said second arms.

5. Applying means, for a brake having a drum and two shoes which are "leading" shoes in both directions of drum rotation, comprising two wedge-shaped members, each acting to spread the shoes at one end thereof, said wedge-shaped members being movable parallel to the axis of the brake drum, a pair of shafts journaled in a supporting member, an arm of each of said shafts moved by rotation of the respective shaft to thrust one of the wedge-shaped members in the shoe spreading direction, a second arm on each of the shafts, and a fluid pressure device having two parts which are simultaneously moved by a change of pressure to rotate said second arms, thereby turning the shafts and actuating the wedges.

6. Applying means, for a brake having a drum and two shoes which are "leading" shoes in both directions of drum rotation, comprising two actuators located at opposite sides of the brake and having cylindrical bores provided therein, two pistons reciprocable in each of said actuators, rollers mounted on the pistons, two wedges, each acting on the rollers in one of the actuators, said wedges being movable substantially parallel to the axis of the brake drum to urge the rollers outwardly, and fluid pressure means for actuating said wedges to move the shoes against the drum.

7. Applying means, for a brake having a drum and two shoes, comprising an actuator located between the shoes having a cylindrical bore provided therein, two pistons reciprocable in said actuator, a roller mounted on each piston, a wedge acting on the rollers, said wedge being movable substantially parallel to the axis of the brake drum to urge the rollers outwardly, and fluid pressure means for actuating said wedge to move the shoes against the drum.

RUDOLPH A. GOEPFRICH.

REFERENCES CITED

The following references are of record in the file of this patent:

UNITED STATES PATENTS

| Number | Name | Date |
|---|---|---|
| 2,140,123 | Whitacre | Dec. 13, 1938 |